US008392168B2

(12) United States Patent
Samper et al.

(10) Patent No.: US 8,392,168 B2
(45) Date of Patent: Mar. 5, 2013

(54) SIMULATING AN APPLICATION DURING A SAMPLING PERIOD AND A NON-SAMPLING PERIOD

(75) Inventors: Ayose Falcon Samper, Barcelona (ES); Paolo Faraboschi, Sant Cugat Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

(21) Appl. No.: 12/611,213

(22) Filed: Nov. 3, 2009

(65) Prior Publication Data

US 2011/0106519 A1    May 5, 2011

(51) Int. Cl.
G06F 9/45 (2006.01)
G06F 9/455 (2006.01)
G06F 9/44 (2006.01)
(52) U.S. Cl. .............................. 703/22; 703/26; 717/131
(58) Field of Classification Search .................... 703/22, 703/26; 717/131–133
See application file for complete search history.

(56) References Cited

U.S. PATENT DOCUMENTS

2008/0244533 A1* 10/2008 Berg et al. ..................... 717/128

OTHER PUBLICATIONS

Lau, Jeremy et al., "The Strong Correlation Between Code Signatures and Performance"), 2005, IEEE.*
Wenisch, Thomas F. et al., "Statistical Sampling of Microarchitecture Simulation", 2006, IEEE.*
Biesbrouck, Michael Van et al. "Efficient Sampling Startup for Sampled Processor Simulation", 2005 Springer-Verlag Berlin Heidelberg.*
Azimi, Reza et al., "Online Performance Analysis by Statistical Sampling of Microprocessor Performance Counters", Jun. 2005, 19th International Conference on Supercomputing (ICS '05), Boston, USA.*
Wenisch, Thomas F. et al., "SimFlex: Stastical Sampling of Computer System Simulation", 2006, IEEE Computer Society.*

* cited by examiner

*Primary Examiner* — Kamini S Shah
*Assistant Examiner* — Cedric D Johnson (57) ABSTRACT

One example embodiment is a method that simulates a sampling period of an application to collect execution counts of basic blocks and compute cycles per instruction (CPI) data. A non-sampling period of the application is simulated to collect execution counts of basic blocks, and a comparison of the execution counts collected during the sampling period is performed to the execution counts collected during the non-sampling period. Based on the comparison, a determination is made whether to estimate CPI for the basic blocks during the non-sampling period using the CPI data collected during the sampling period.

10 Claims, 4 Drawing Sheets

SIMULATING AN APPLICATION DURING A SAMPLING PERIOD AND A NON-SAMPLING PERIOD

BACKGROUND

Simulation is a technique in computer architecture to calculate the performance of a new system or software application. Simulating complex systems and applications can be quite time consuming and process intensive.

Sampling techniques are commonly used to reduce the large overhead of simulation tools. The main idea behind sampling is to simulate only a limited number of application zones instead of the entire application execution. This technique, however, produces inaccuracies since only a portion of the execution paths are simulated with timing.

DETAILED DESCRIPTION

Example embodiments relate to systems, methods, and apparatus that predict performance of a software application based on estimating and reusing performance of execution paths during sampling simulation of the application.

In one example embodiment, a simulator simulates samples of an application. During a time when the simulator is in between samples (i.e., non-sampling period), light-weight profiling is performed. During this profiling, information is gathered (such as data from program counters), and this information is compared with data collected during the sampling phase. This comparison determines a similarity between the execution paths in the sample and executions paths not part of the sample. If the comparison reveals a sufficient similarity, then the sample is representative of the executions paths not sampled. On the other hand, if the comparison reveals a sufficient dissimilarity, then a new sampling phase is initiated for the execution paths previously not sampled.

Different information is gathered depending on whether the simulator is executing during a sampling or measurement phase or executing during a non-sampling or non-measurement phase. During this latter time (i.e., non-sampling phase), light-weight profiling continues (i.e., information is still gathered).

During the non-measurement phase as light-weight profiling occurs, the simulator only emulates the functional behavior of the instructions in order to reproduce the correct behavior of the system and the software applications under analysis. During a measurement phase, in addition to emulating the functional behavior, the simulator also estimates the time it takes to complete the instructions for a given set of architecture and micro-architecture parameters, such as the size of the central processing unit (CPU) caches, the details of the memory hierarchy, the details of the branch predictor, etc. Because of this, the measurement phase has a much higher computational load than a non-measurement phase and can be 1,000-10,000 times slower.

Large applications contain billions of microprocessor instructions every second of execution. Measuring the Cycles-Per-Instruction (CPI) of a full instruction stream with a simulator is a time-consuming and process intensive endeavor (CPI is the number of clock cycles that occur while an instruction is being executed). Statistical sampling techniques estimate applications by measuring only a sample (i.e., a temporal subset) of the entire application. By examining this subset of the application, inferences are made about execution of the entire application (for example, how long the application takes to execute or resources used to execute the application.

During sampling, timing simulation is activated so the performance of all the application zones (also called application paths) that occur during the sample are fully measured.

One source of inaccuracies in sampling is how to take into account the performance of application paths that were not characterized during a measurement sample, when running a non-measurement phase. For example, when the application enters an execution loop, a small measurement sample can be used to accurately characterize a much larger non-measurement phase as long as the application remains in the same loop. If the application exits the loop while in a non-measurement phase, the previous characterization no longer applies and using it for the new application paths may cause the accuracy to diminish.

One example embodiment measures and obtains performance information of a program or application using a simulator or an emulator during a sampling (measurement) period or phase. This performance information of applications paths obtained during the sampling phase is used to improve the accuracy of estimations for applications paths during non-sampling phases or periods (i.e., during a time when no timing information is gathered for paths in between samples).

Example embodiments estimate performance of non-measurement application paths during non-measurement periods using two different techniques. Non-measurement application paths are paths that occur in between samples or application paths. In one technique, new measurement phases can be triggered or obtained during non-measurement periods. In another technique, previously recorded performance measurements are reused to calculate the performance of paths of interest (or interesting paths) observed during non-measurement periods. As used herein, the terms measurement phase, measurement period, sampling phase, and sampling period are synonymous. Further, the terms non-measurement phase, non-measurement period, non-sampling phase, and non-sampling period are synonymous.

One example embodiment identifies paths of interest (such as basic blocks, loops, or functions) in the application. When these paths are discovered during a measurement or sampling phase when timing is on and timing information is being gathered, the cycles per instructions (CPI) for this path executing on a given processor are saved (CPI is the average number of clock cycles per instructions executed by the processor). When paths of interest are discovered during non-measurement phases, then a new measure phase is triggered if no CPI information for this path has been gathered. Further, if CPI information for this path has been previously gathered, then this information is reused. The CPI of the new instance of this path of interest is calculated according to the previous CPIs collected for this path.

Figure 1:
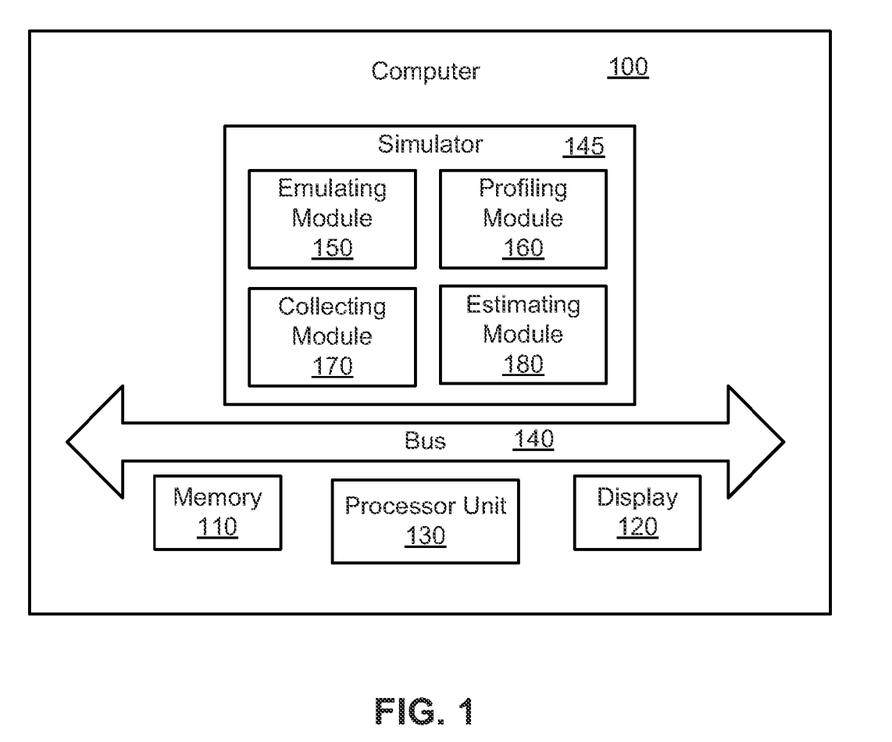
FIG. 1 shows a computer for simulating performance of software applications in accordance with an example embodiment.

FIG. 1 shows a computer 100 for simulating performance of software applications in accordance with an example embodiment. By way of example, the computer 100 includes memory 110, display 120, processing unit 130, a software simulator 145 having a plurality of modules (150, 160, 170, and 180), and one or more buses or connections 140 coupling the components together. The processor unit includes a processor (such as a central processing unit, CPU, microprocessor, application-specific integrated circuit (ASIC), etc.) for controlling the overall operation of memory 110 (such as random access memory (RAM) for temporary data storage, read only memory (ROM) for permanent data storage, and firmware) and executing the software simulator and its modules. The processing unit 130 communicates with memory 110 and the modules via one or more buses 140 and performs operations and tasks necessary for executing the modules. The memory 110, for example, stores applications, data, programs, algorithms (including software to implement or assist in implementing embodiments in accordance with the present invention, such as the simulator) and other data.

In some example embodiments, computer 100 is used to simulate cloud computing resource needs for a software application executing on a cloud-based server or computer. As used herein, a "cloud" is a computer network accessible over the internet and/or web that is dynamically scalable with virtualized resources.

The software simulator 145 includes a plurality of modules. By way of example, these modules include an emulating module or emulator 150, a profiling module or profiler 160, a collecting module or collector 170, and an estimating module or estimator 180.

The emulating module or emulator 150 executes and emulates basic blocks of code or instructions. These basic blocks of code are tagged before being placed into an execution buffer (called code cache or translation cache). When the basic block is executed, the emulating module 150 invokes the profiling module 160.

In some example embodiments, emulator 150 can emulate one or more processors or chip architectures on a cloud-based server or computer.

An example emulator is a binary translating emulator. Binary translation is the emulation of one instruction set by another through translation code. Sequences of instructions are translated from a source set of instructions to a target set of instructions. In one embodiment, the emulator obtains a short sequence of code (for example, a single basic block: i.e., code with one entry point and one exit point), translates the code, and caches the resulting sequence.

Further, various forms of tagging can be used, such as binary instrumentation and software emulation. One embodiment uses dynamic binary translation where a profiling hook is implemented by tagging the beginning of blocks of code and invoking the profiler 160 during dynamic execution.

Execution of a tagged instruction invokes the profiling module or profiler 160. The profiling module is responsible for identifying paths of interests (such as loops or function calls) and updating its execution statistics. Examples of execution statistics include, but are not limited to amount of instructions executed in the paths, amount of cycles that those instruction took, memory access statistics (miss ratio), branch statistics (mis-prediction rates), or consumed power.

In one embodiment, the profiler is continuously active and is responsible for collecting the functional execution pattern of the software application being simulated. The functional execution pattern can be represented as the set of basic blocks whose instructions have been executed by the emulator. For example, the profiler can mark the beginning of all basic blocks with a special instruction. When that special instruction is executed, the profiler is invoked and can collect the execution count (and other statistics) for the corresponding basic block.

As used herein and in the claims an "interesting path" or "path of interest" is a path whose execution had a significant contribution to the simulation phase. For example, if a certain simulation phase remains entirely within a single loop, the loop is likely the most "interesting path" for that phase. Conversely, in a simulation phase containing a large number of paths, each with a small execution count, none of the paths are considered "interesting."

In one embodiment, the paths of interest include likely cyclic paths (e.g., loops) in the application. Likely cyclic paths can include just a single basic block or single instruction or entire subroutines and functions as interesting paths.

In one embodiment, the profiler 160 selects the interesting paths within a measurement interval by identifying a top fraction of the total execution of the phase based on a heuristic parameter. By way of illustration, the measurement interval could contain only one path. Here, the assignment is more precise since the interval contains a single path. In other embodiments, the measurement interval includes multiple paths.

The confidence of assigning an aggregated observed CPI diminishes as the observed path execution frequency of a path decreases. For example, if a measurement interval contains four paths with execution frequency 50%, 40%, 6% and 4%, and the embodiment uses a "top fraction" of no less than 30%, the CPI is assigned to the first two and not the others.

The collecting module or collector 170 is responsible for collecting metrics (for example, CPI) or energy per instruction) for the paths that encounter during a measurement phase. The measurement phase may not strictly coincide with an individual path. This occurs because it may not be possible to query performance metrics at every level of executing instructions (i.e., fine granularities). Further, one embodiment filters out or removes transitory effects during execution by observing large enough durations so that the dominant behavior is correctly reflected in the observed metrics.

In one embodiment, the collector 170 collects paths of interest during a non-measurement (i.e., functional) interval and sorts them by their relative number of executed instructions.

The estimating module or estimator 180 is responsible for estimating a new metric (such as CPI) during non-measurement phases based on the observed path profile and the information saved by the collector 170.

Figure 2:
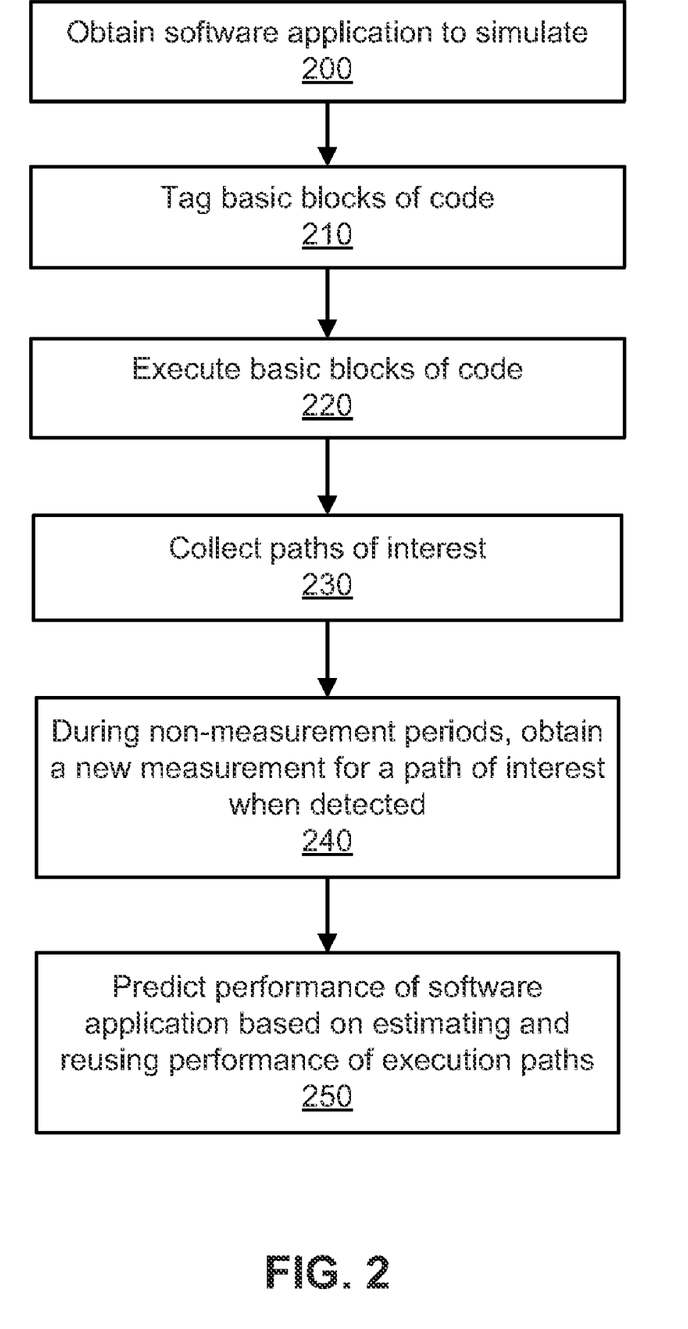
FIG. 2 shows a flow diagram for simulating performance of software applications in accordance with an example embodiment.

FIG. 2 is a flow diagram for simulating performance of software applications in accordance with an example embodiment. FIG. 2 references elements shown in FIG. 1.

According to block 200, a software application to be simulated is received or obtained.

According to block 210, basic blocks (BB) of code of the software application are tagged before these blocks are executed (e.g., before the BB enter an execution buffer). For example, the emulator 150 tags the basic blocks.

According to block 220, the basic blocks of code are executed. For example, the emulator 150 executes the blocks and invokes the profiler 160.

According to block 230, metrics for paths of interest are collected. For example, the profiler 160 collects paths of interest (such as loops and function calls) and updates its execution statistics. Example metrics collected include, but are not limited to, amount of instructions executed in the paths, amount of cycles that those instruction took, memory access statistics (miss ratio), branch statistics (mis-prediction rates), or consumed power.

According to block 240, during non-measurement periods, when a path of interest is detected that was not part of the characterization of the last measurement period, a new measurement sample is invoked. During measurement periods, the collecting module 170 collects paths that the profiler 160 determines are paths of interest. During non-measurement periods, each time a new path of interest that was not previously characterized is detected, a new measurement interval is started so that the new path can be accurately characterized.

As used herein and in the claims, reusing CPI information collected during a sampling period for paths of interest during a non-sampling period means computing a new CPI value for the execution by appropriately combining the CPI's of the individual paths together with their relative execution frequency. For example, assume that a non-measurement phase is being executed with an estimated CPI of 2.0 (calculated in the previous measurement sample). If a new path with a CPI of 3.0 that was not executed in the previous sample is detected by the profiler, the non-measurement CPI is changed to 3.0 while execution remains in the new path. If execution of the previous path resumes, the CPI also correspondingly changes back to 2.0.

With execution of this step, the simulation speed is not affected (i.e., does not decrease) since the number of measurement intervals remains constant (i.e., does not increase). At the same time, a final accuracy of predicting performance of the software application is improved since more paths are characterized.

One embodiment assigns the CPI to the top executed paths in a non-measurement interval based on previous observations within measurement intervals. These mechanisms include, but are not limited to: using the last value, an average of the last N values, or the median of the last N values.

Example embodiments are not limited to obtaining a new measurement interval according to block 240. For example as an alternate step, when a path of interest is detected during non-measurement periods, the CPI previously collected is reused. Thus, each time an interesting path is detected, reuse the CPI previously collected. After a plurality of CPIs has been collected, a new CPI is calculated with a particular formula (average, median, perception predictor, etc.).

In one embodiment, a new measurement sample is obtained if a significant fraction of paths (i.e., greater than 50%) that have not yet been characterized appear in a non measurement interval.

With execution of this alternate step, a total simulation time is decreased since a total number of measurement intervals are lower than a standard configuration. The final accuracy is maintained or reduced since measurement phases are initiated for the paths of interest.

According to block 250, the performance of the software application is predicted based on estimating and reusing performance of execution paths.

Performance of cyclic structures in a software application (like loops or function calls) tends to be repetitive. By knowing the behavior of previous instances of a loop, the simulator can estimate with a high probability what will be the performance of its next instance. This is also true for certain functions or procedures which have a limited number of performance behaviors independent on the input parameters.

Figure 3:
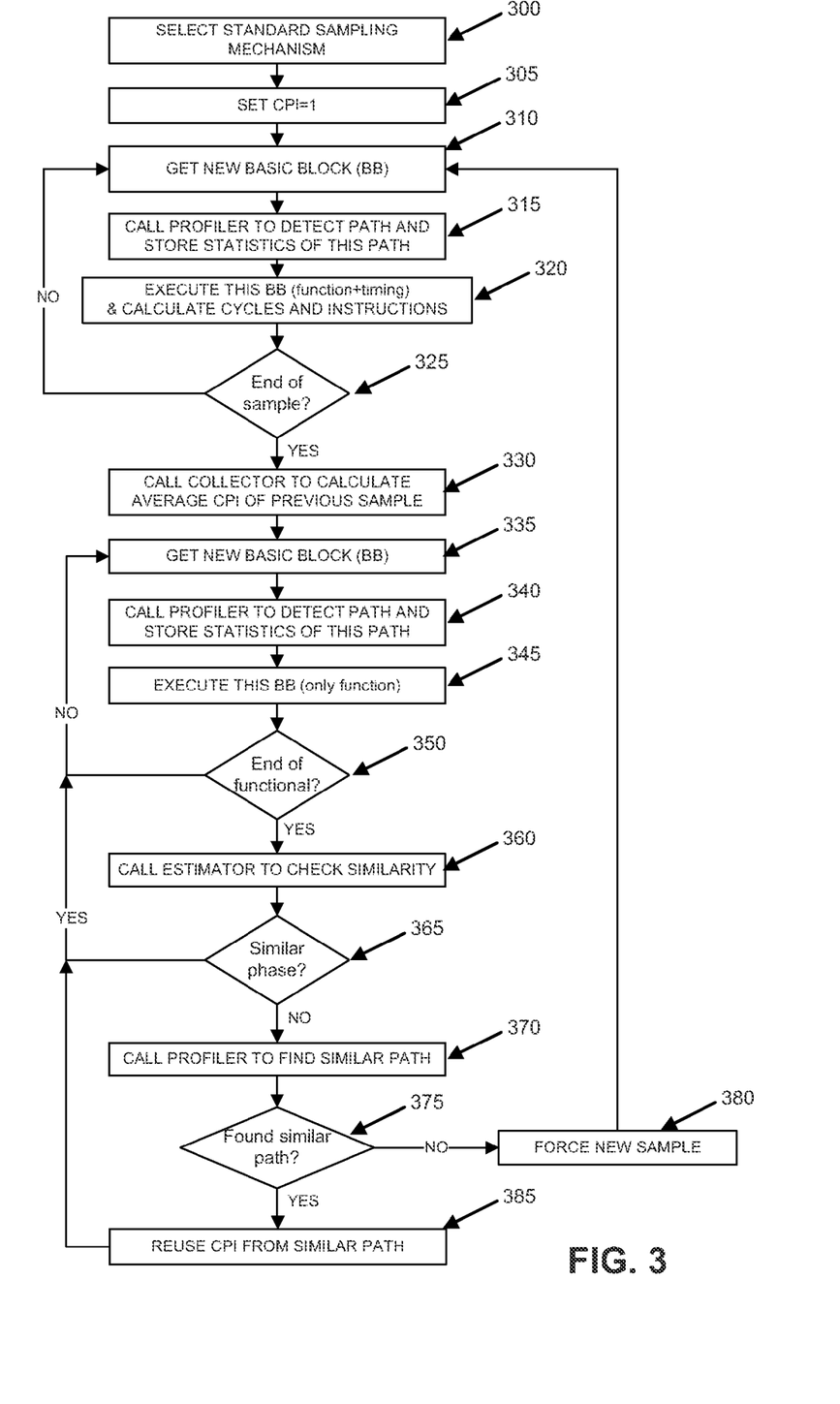
FIG. 3 shows another flow diagram for simulating performance of software applications in accordance with an example embodiment.

FIG. 3 shows another flow diagram for simulating performance of software applications in accordance with an example embodiment. FIG. 3 references elements of the simulator shown in FIG. 1.

According to block 300, a standard sampling mechanism is selected. In one embodiment, the sampling mechanism determines when to activate timing and for how long.

According to block 305, the cycles-per-instruction are set to one (CPI=1).

According to block 310, a new basic block of instructions of the application is obtained.

According to block 315, a profiler is called to detect the execution path and store information or statistics about this path. For example, the profiler 160 in FIG. 1 is called.

According to block 320, the basic block is executed (for example, with function and timing). During execution of the basic block, cycles and instructions are calculated and CPI is computed from their ratio. This stage is in a sample so timing is turned on, and a number of cycles is accurately calculated.

According to block 325, a determination is made as to whether an end of the sample has occurred. The result of this determination depends on the sampling mechanism selected in block 300. If the end has occurred, flow loops back to block 310. If an end has not occurred, flow proceeds to block 330.

According to block 330, a collector is called to calculate the average CPI of the interesting paths within the previous sample. For example, the collector 170 in FIG. 1 is called. The collector calculates or estimates the CPI based on a set of paths seen during execution of the sample.

According to block 335, a new basic block is obtained.

According to block 340, a profiler is called to detect the path and store statistics for this path. For example, the profiler 160 in FIG. 1 is called. The paths are detected, and statistics stored.

According to block 345, the function of the basic block is executed. Here, the stage is functional, so no timing information is measured.

According to block 350, a determination is made as to whether the functional (non-measurement) emulation phase has ended. The result of this determination depends on the sampling mechanism selected in block 300. If the functional phase has ended, flow loops back to block 335. If the functional phase has not ended, flow continues to block 360.

According to block 360, an estimator is called to check the similarity of the set of paths executed in the last non-measurement (functional) phase with the reference set of paths executed in the last measurement sample. For example, the estimator 180 in FIG. 1 is called. Here, if the current set of paths is similar to the set of paths seen on the sample, then the current set of paths is considered valid and no change occurs. To compute the dissimilarity between two sets of paths, one embodiment uses the sum of the absolute difference of the relative execution ratios of each path within the simulation sample. For example, assume that the first set of paths is: Path A executed 50%, Path B executed 40% and Path C executed 10%. Let us also assume that the second set of paths is: Path A executed 40%, Path B executed 55% and Path D executed 5%. In this case the similarity of the two paths can be computed as |50%-40%| for Path A+|40%-55%| for Path B+10% for Path C+5% for Path D. That adds up to a dissimilarity of 40%, or in other words, a similarity of 60% of the two sets of paths.

According to block 365, a determination is made as to whether the phase is similar. If the answer to this question is yes, then flow loops back to block 335. If the answer to this determination is no, then flow proceeds to block 370.

According to block 370, a profiler is called to find a similar path. For example, the profiler 160 in FIG. 1 is called. Here, a determination is made as to whether the set of paths have already been seen in the past (i.e., during a previous basic block execution). If the set of paths has already been seen, then an assumption is made that the CPI is the same. Otherwise, force a new sample to collect cycles of this new set of paths.

According to block 375, a determination is made as to whether a similar path is found. If a similar path is not found, flow proceeds to block 380 and a new sample is forced or obtained. Flow loops back to block 310. If a similar path is found, flow continues to block 385.

According to block 385, the CPI from the similar path is reused. Flow then loops back to block 335.

The methods illustrated by FIGS. 2 and 3 can be delivered over a network as part of software as a service to a client to simulate and/or determine computer resource needs for a particular software application. By way of example, such computer resource needs include, but are not limited to, CPI, memory, network bandwidth, processing, or other suitable resources.

Figure 4:
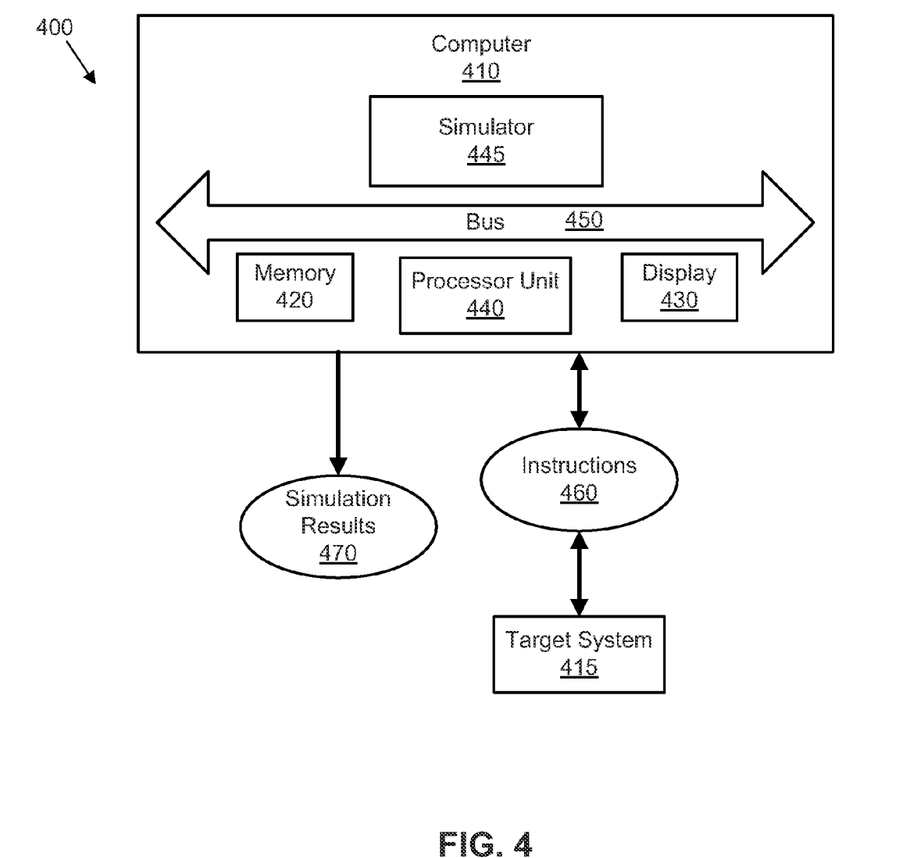
FIG. 4 shows a computer system for executing example embodiments.

FIG. 4 shows a computer system 400 for executing example embodiments, such as the methods discussed in FIGS. 2 and 3.

The computer system 400 includes a computer 410 in communication with a target system 415, such as a single or multi-processor system. By way of example, the computer 410 includes memory 420, display 430, processing unit 440, and a simulator 445 (such as the simulator 145 discussed in FIG. 1) in communication through one or more connections or buses 450. The processor unit includes a processor (such as a central processing unit, CPU, microprocessor, application-specific integrated circuit (ASIC), etc.) for controlling the overall operation of simulator 445 and memory 420 (such as random access memory (RAM) for temporary data storage, read only memory (ROM) for permanent data storage, and firmware). The processing unit 440 communicates with memory 420 and the simulator 445 via one or more buses 450 and performs operations and tasks necessary for executing simulations of application or program instructions 460. The memory 420, for example, stores applications, data, programs, algorithms (including software to implement or assist in implementing embodiments in accordance with the present invention) and other data.

The simulator 445 simulates execution of instructions 460 by the target system 415 and provides simulations results 470 corresponding to this simulation. In one embodiment, the simulator 445 provides non-functional simulation of execution of the instructions 460 by the target system 415, such as timing simulation (i.e., a length of time the target system 415 incurs in executing the instructions 460), power simulation (i.e., an amount of power the target system 415 uses to execute the instructions), or other functional or non-functional simulations.

The simulation results 470 can be output from the computer 410, stored in the computer or other location, displayed on display 430, transmitted across one or more networks, processed, etc.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible computer-readable media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The following pseudo-code provides an example of an algorithm for an example embodiment. This pseudo-code can be executed as part of the flow diagrams shown in FIGS. 2 and 3 and computer systems shown in FIGS. 1 and 4.

```
//////////////////////////////////////////////////////
// basic data structures
struct Path { // path information
    vector<PC> path; // vector of PCs of each block in the path
    int len; // number of instructions in the path
    int device; // device (CPU) number
    vector<double> cpi; vector of measured CPIs
    int count; // execution count (in instructions)
};
// associative map from vector of PCs to Path information
map<vector<PC>,Path> paths;
// associative map from Paths to simulation count
map<Path,int> sim_paths;
//////////////////////////////////////////////////////
// function called when a 'tagged' instruction is executed
tag_execute(time, tag, device)
{
    taginfo = tags[tag]; // search the structure for this tag
    pc = taginfo.pc; // extract the PC
    len = taginfo.len; // and the instruction length
    totsimcount += len; // accumulate the instruction count
    path = profile(device,pc,len); // call the profiler
    if (path) // if we found a path, add it to the list of simulated paths
        sim_paths[path] += path->len;
}
//////////////////////////////////////////////////////
// function called during tagged execution
// Note that in this example we search for cyclic paths,
// but the algorithm could easily be extended to other region
// shapes of interest
```

-continued
```
profile(device, current_pc, len)
{
    // Search for loops and update profile
    loop = 0;
    previous_pc = current_path[1]; // get previous pc from saved
    dynamic path
    if (current_pc <= previous_pc) // we found a back edge
    {
        vector<PC> pcv; // save path PCs in a vector
        pcv.push_back(cur_pc);
        instlen=cur_pc.len;
        l=1 ; // search for a cyclic path up to a certain depth
        while(l<=maxpathlen && prev_pc!=cur_pc)
        {
            pcv.push_back(prev_pc);
            instlen+=prev_pc.len;
            prev_pc = current_path[++l];
        }
        if (l<=maxpathlen) // found a cyclic path
        {
            // if path was found before, update count
            if (paths.find(pcv))
                paths[pcv].count += instlen;
            else
            // else add new path
                paths[pcv]=Path(pcv,instlen,device);
            loop=paths[pcv];
        }
    }
    current_path.push_back(current_pc);
    return loop;
}
/////////////////////////////////////////////////////////////
// function called at the beginning of a measurement chunk
// to initialize the estimator
beginMeasurement( )
{
    sim_paths.clear( );
    totsimcount=0;
}
/////////////////////////////////////////////////////////////
// function called at the end of a measurement chunk
// implementing the estimator
endMeasurement( )
{
    // Estimate the CPIs only for the paths that we
    // saw for long enough during the measurement chunk
    mincount = totsimcount * top_path_fraction;
    for (sim_path in sim_paths)
    {
        uint64_t count = sim_path.count;
        if (count > mincount)
        {
            path = sim_path.path;
            device = path.device;
            cpi = device_metric[device].cpi( );
            // get the measured statistics for the CPU
            path.cpi.push_back(cpi);
        }
    }
}
/////////////////////////////////////////////////////////////
// function called at the end of an "emulation" chunk to
// determine the CPI of the observed paths and whether we
// want to start a new measurement phase
estimator( )
{
    // Sort simulated paths by execution count and search
    // the top fraction to decide if we need to break
    sort(paths);
    brk=false;
    for (path in top_fraction(paths))
        if (path.cpi( ).empty( ))
            brk=true;
    if (brk) // Found warm path with no CPI: force simulation
        force_measurement( );
    // Compute CPI for all devices as a weighted average of the
    // measured CPIs (by the collector) using the current path count
    for (path in sim_paths)
    {
        cpi = path.estimated_cpi( );
        device_cpi[path.device].insts += path.count;
        device_cpi[path.device].cycle += cpi * path.count;
    }
    // Now set the CPI for all CPUs based on what we estimated above
    for (device in device_cpi[])
    {
        cpi = device_cpi[device].cycles / device_cpi[device].insts;
        device.set_cpi(cpi);
    }
}
```

What is claimed is:

1. A method to predict performance of an entire application based on estimating and reusing performance information of execution paths measured during a simulation of the application by a computer for a target system, comprising:
selecting for the target system a given set of architectural and micro-architectural parameters;
executing instructions of a simulator, the simulator having an emulating module, a profiling module, a collecting module, and an estimating module, to simulate the application for the target system, wherein executing the simulator instructions includes:
executing instructions of the emulating module to tag a beginning of each basic block of code with one entry point and one exit point for the entire application before execution, to emulate each tagged basic block of code in the entire application, and to invoke a profiling module;
executing instructions of the profiling module that are continuously active throughout the simulation during both a non-measurement phase and a measurement phase of the simulation to mark the beginning of all basic blocks of code to track paths, wherein executing instructions of the profiling module, comprises;
collecting a functional execution pattern of the tagged basic blocks of code including paths, executed by the emulating module, and collecting execution counts, during a non-measurement phase of the simulation;
collecting the functional execution pattern of the tagged basic blocks of code including paths, executed by the emulating module, and collecting execution counts and additionally calculating cycles per instruction (CPI), during a measurement phase, but not during the non-measurement phase, of the simulation; and
identifying paths of interest during the measurement phase and the non-measurement phase based on whether collected execution counts of a particular path in a particular measurement phase and a particular path in a particular non-measurement phase exceed a threshold of execution counts as a percentage of a total number of execution counts in the measurement and the non-measurement phase; and
executing instructions of the collecting module to collect and save metrics associated with paths of interest, including collecting CPI based on collected execution counts and timing information gathered only for paths of interest during a measurement phase, and collecting and sorting paths of interest by collected execution counts during a non-measurement phase; and
executing instructions of the estimating module to compute a similarity percentage, as determined from execution counts of paths, between a set of paths of interest executed in a last non-measurement phase of the simulation and a set of paths of interest executed in a last measurement phase of the simulation, and compare the computed similarity percentage to a chosen similarity percentage threshold to decide whether to force a new measurement phase for the set of paths of interest in the last non-measurement phase of the simulation.

2. The method of claim 1, wherein executing instructions of the estimating, comprises:
if the set of paths executed in the last non-measurement phase of the simulation satisfy the chosen similarity percentage threshold to the set of paths executed in the last measurement phase of the simulation, then using a CPI calculation associated with the set of paths executed in the last measurement phase of the simulation as a CPI estimate to associate with the set of paths executed in the last non-measurement phase of the simulation and continuing with a next non-measurement phase of the simulation;
if the set of paths executed in the last non-measurement phase of the simulation do not satisfy the chosen similarity percentage threshold to the set of paths executed in the last measurement phase of the simulation, then calling the profiling module to search paths saved by the collecting module to check whether another saved set of paths in a previous measurement phase of simulation matches the set of paths executed in the last non-measurement phase of the simulation, and if another saved set of paths in a previous measurement phase of simulation matches the set of paths executed in the last non-measurement phase of the simulation, then reusing a CPI calculation associated with the set of paths executed in the matching previous measurement phase of the simulation as the CPI to associate with the set of paths executed in the last non-measurement phase of the simulation and continuing with a next non-measurement phase of the simulation; and
if the set of paths executed in the last non-measurement phase of the simulation does not satisfy the chosen similarity percentage threshold to the set of paths executed in the last measurement phase of the simulation and another saved set of paths in a previous measurement phase of simulation does not match the set of paths executed in the last non-measurement phase of the simulation, then forcing a new measurement phase for the set of paths in the last non-measurement phase of the simulation.

3. The method of claim 2, wherein:
collecting a functional execution pattern of the tagged basic blocks of code being simulated comprises representing the functional execution pattern as a set of basic blocks whose instructions have been executed by the emulator as a path; and
wherein executing instructions of the profiling module comprises marking the beginning of all tagged basic blocks with a special instruction such that when the special instruction is executed by the emulating module the profiling module is invoked and can track the tagged basic blocks of the application as belonging to the path.

4. The method of claim 3, wherein identifying paths of interest during the measurement phase and the non-measurement phase based on whether collected execution counts of the particular path in the particular measurement phase and the particular path in the particular non-measurement phase exceed the threshold of execution counts for the phase, comprises:
using a chosen percentage of collected execution counts associated with the particular path to a total collected execution count for the particular measurement phase and the particular non-measurement phase as the threshold of execution counts.

5. The method of claim 4, wherein executing instructions of the estimating module to compare the similarity percentage between the set of paths executed in the last non-measurement phase of the simulation and a set of paths executed in the last measurement phase of the simulation to the chosen similarity percentage threshold, comprises:
computing a dissimilarity percentage between the set of paths in the last non-measurement phase and the last measurement phase of the simulation as the sum of the absolute difference of a relative execution ratio of each path within the set of paths in the last non-measurement phase and the last measurement phase of the simulation divided by 100; and
deriving the similarity percentage between the set of paths executed in a last non-measurement phase of the simulation and a set of paths executed in the last measurement phase of the simulation from the computed dissimilarity percentage as 100 minus the computed dissimilarity percentage.

6. The method of claim 5, wherein the method comprises:
selecting a sampling mechanism for the target system including the given set of architecture and micro-architecture parameters such as a size of processing resources, a memory hierarchy, and information on branch prediction schema;
executing profiler module instructions first for performing a measurement phase of the simulation on basic blocks of code in the application;
continuing to perform the measurement phase of the simulation until an end of the measurement phase is reached as determined by the selected sampling mechanism;
upon reaching the end of the measurement phase of the simulation, executing instructions of the collection module to calculate and save the CPI of paths of interest;
executing profiler module instructions second for performing a non-measurement phase of the simulation on basic blocks of code in the application;
continuing to perform the non-measurement phase of the simulation until an end of the non-measurement phase is reached as determined by the selected sampling mechanism; and
executing profiler module instructions third for performing a next non-measurement phase of the simulation on basic blocks of code in the application, unless executing instructions of the estimation module has not satisfied the chosen similarity threshold percentage and has not found a path match with saved paths of interest in previous measurement phases of simulation.

7. A simulator having instructions executed by a processor, the simulator comprising;
an emulator module having instructions that are executed to tag each basic block of code in an entire application to be simulated, that are executed to emulate each tagged basic blocks of code in the entire application during simulation, and executed to invoke a profiling module;
a profiler module having instructions that are executed to:
continuously perform light-weight profiling on each basic block of the application, in a measurement phase and a non-measurement phase, as executed by the emulating module, to emulate functional behavior and collect execution counts for each basic block of the entire application;

additionally calculate cycles per instruction (CPI) during a measurement phase of the simulation, but not gather timing information during a non-measurement phase of the simulation; and identify paths of interest during the measurement phase and non-measurement phase based on whether collected execution counts of a particular path in a particular measurement phase and non-measurement phase exceed a threshold; and an estimator module having instructions that are executed to check a similarity of a set of paths executed in a last non-measurement phase of the simulation as compared to a set of paths executed in a last measurement phase of the simulation based on execution counts and to:

use a CPI calculation associated with the set of paths executed in the last measurement phase of the simulation as a CPI estimate to associate with the set of paths executed in the last non-measurement phase of the simulation and to continue with a next non-measurement phase of the simulation, if the set of paths executed in the last non-measurement phase of the simulation satisfies a similarity threshold as compared to the set of paths executed in the last measurement phase of the simulation;

call the profiler module to search paths saved by the collector module, if the set of paths executed in the last non-measurement phase of the simulation does not satisfy a similarity threshold as compared to the set of paths executed in the last measurement phase of the simulation, and to:

check whether another saved set of paths in a previous measurement phase of the simulation matches the set of paths executed in the last non-measurement phase of the simulation;

reuse a CPI calculation associated with the set of paths executed in a previous measurement phase of the simulation as the CPI to associate with the set of paths executed in the last non-measurement phase of the simulation, if another saved set of paths in the previous measurement phase of simulation matches the set of paths executed in the last non-measurement phase of the simulation; and continue with a next non-measurement phase of the simulation; and force a new measurement phase, having timing on to calculate CPI, for the set of paths in the last non-measurement phase of the simulation, if the set of paths executed in the last non-measurement phase of the simulation does not satisfy a similarity threshold to the set of paths executed in the last measurement phase of the simulation and another saved set of paths in a previous measurement phase of simulation does not match the set of paths executed in the last non-measurement phase of the simulation.

8. A non-transitory computer-readable medium having non-transitory instructions stored thereon that when executed by a simulator cause a computer to:

select a sampling mechanism to perform a simulation of tagged basic blocks of code in an application for a target system including a given set of architecture and micro-architecture parameters;

execute profiling module instructions to perform a measurement phase of the simulation on tagged basic blocks of code in the application, the measurement phase to emulate function, to collect execution counts, and having timing turned on to gather timing information;

continue to perform the measurement phase of the simulation until an end of the measurement phase is reached as determined by the sampling mechanism;

execute instructions of a collecting module to calculate and save cycle per instruction (CPI) for paths of interest based on collected execution counts and gathered timing information;

once the end of the measurement phase is reached, execute the profiling module instructions to perform a non-measurement phase of the simulation on tagged basic blocks of code in the application, the non-measurement phase to emulate function and to collect execution counts without having timing turned on to gather timing information;

continue to perform the non-measurement phase of the simulation until an end of a non-measurement phase is reached as determined by the sampling mechanism;

once the end of the non-measurement phase is reached, execute instructions of an estimating module to:

determine whether a similarity threshold is satisfied between a path of interest in a last non-measurement phase of simulation and a path of interest in a last measurement phase of simulation;

if the similarity threshold is satisfied,
use a CPI associated with the path of interest in the last measurement phase of simulation as an estimate of a CPI for the path of interest in the last non-measurement phase, and continue to execute profiling module instructions to perform a next non-measurement phase of the simulation on tagged basic blocks of code in the application;

if the similarity threshold has not been satisfied,
call the profiling module to:
search paths saved by the collecting module to determine whether a path match to saved paths of interest in previous measurement phases of simulation can be found, reuse a CPI associated with the path match as the CPI for the path of interest in the last non-measurement phase, if the path match is found, and continue to execute profiling module instructions to perform the next non-measurement phase of the simulation on tagged basic blocks of code in the application; and execute instructions of the profiling module to force a new measurement phase on the path of interest in the last non-measurement phase only if the similarity threshold has not been satisfied and the path match has not been found.

9. The medium of claim 8, wherein the instructions are executed to:

identify paths of interest during the measurement phase and non-measurement phase based on whether collected execution counts of a particular path in a particular measurement phase and non-measurement phase exceed a threshold that is a particular percentage of collected execution counts of the particular path to a total collected execution count for the particular measurement phase and non-measurement phase as the threshold.

10. The medium of claim 9, wherein instructions can be executed by the estimating module to determine whether the similarity threshold is satisfied as a comparison of a similarity percentage between the set of paths executed in a last non-measurement phase of the simulation and a set of paths executed in the last measurement phase of the simulation to a chosen similarity threshold percentage, wherein instructions can be executed to:

compute a dissimilarity percentage between the set of paths in the last non-measurement phase and the last measurement phase of the simulation as the sum of the absolute difference of a relative execution ratio of each path within the set of paths in the last non-measurement phase and the last measurement phase of the simulation divided by 100; and derive the similarity percentage between the set of paths executed in a last non-measurement phase of the simulation and a set of paths executed in the last measurement phase of the simulation from the computed dissimilarity percentage as 100 minus the computed dissimilarity percentage.

* * * * *